US009438533B2

(12) United States Patent
Mehra et al.

(10) Patent No.: US 9,438,533 B2
(45) Date of Patent: *Sep. 6, 2016

(54) METHODS AND APPARATUS FOR STANDARD PROTOCOL VALIDATION MECHANISMS DEPLOYED OVER A SWITCH FABRIC SYSTEM

(71) Applicant: Juniper Networks, Inc., Sunnyvale, CA (US)

(72) Inventors: Ashwani Kumar Mehra, Bangalore (IN); Srikar Rajamani, Bangalore (IN); Saurabh Saksena, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,685

(22) Filed: Aug. 1, 2014

(65) Prior Publication Data
US 2014/0341045 A1 Nov. 20, 2014

Related U.S. Application Data

(63) Continuation of application No. 12/981,033, filed on Dec. 29, 2010, now Pat. No. 8,798,077.

(51) Int. Cl.
*H04L 12/24* (2006.01)
*H04L 12/947* (2013.01)
(Continued)

(52) U.S. Cl.
CPC ............ *H04L 49/25* (2013.01); *H04L 41/12* (2013.01); *H04L 45/24* (2013.01); *H04L 43/04* (2013.01); *H04L 43/50* (2013.01); *H04L 45/28* (2013.01); *H04W 24/08* (2013.01)

(58) Field of Classification Search
CPC ........................................ H04L 41/12
USPC ............... 370/237, 241, 359, 229, 384, 468
See application file for complete search history.

(56) References Cited

U.S. PATENT DOCUMENTS 5,166,926 A 11/1992 Cisneros et al.
5,390,173 A 2/1995 Spinney et al.
(Continued)

FOREIGN PATENT DOCUMENTS

CN 1430386 7/2003
EP 1 320 219 A2 6/2003

OTHER PUBLICATIONS

Spirent Communications, "Packet Generator and Analyzer Base Package" P/N 79-000028 Rev.E May 2007, ©2007 Spirent Communications, Inc., 8 pages.
(Continued)

*Primary Examiner* — Andrew Lai
*Assistant Examiner* — Andrew C Lee
(74) *Attorney, Agent, or Firm* — Cooley LLP

(57) ABSTRACT

An apparatus includes a destination edge device configured to receive a first validation packet according to a switch fabric validation protocol. The destination edge device is configured to validate multiple data paths through a distributed switch fabric from a source edge device to the destination edge device based on the first validation packet. The destination edge device is configured to send, in response to receiving the first validation packet, a second validation packet to a peripheral processing device. The destination edge device is also configured to send the second validation packet according to a validation protocol different from the first validation protocol.

20 Claims, 7 Drawing Sheets

(51) Int. Cl.
*H04L 12/707* (2013.01)
*H04L 12/26* (2006.01)
*H04W 24/08* (2009.01)
*H04L 12/703* (2013.01)

(56) References Cited

U.S. PATENT DOCUMENTS

| | | | |
|---|---|---|---|
| 5,408,231 A | 4/1995 | Bowdon | |
| 5,600,638 A | 2/1997 | Bertin | |
| 5,689,500 A | 11/1997 | Chiussi et al. | |
| 5,909,686 A | 6/1999 | Muller et al. | |
| 5,982,770 A | 11/1999 | Sekine | |
| 6,075,773 A | 6/2000 | Clark et al. | |
| 6,335,930 B1 | 1/2002 | Lee | |
| 6,335,992 B1 | 1/2002 | Bala et al. | |
| 6,498,794 B1* | 12/2002 | Tsukamoto et al. | 370/395.1 |
| 6,553,030 B2* | 4/2003 | Ku et al. | 370/390 |
| 6,647,017 B1 | 11/2003 | Heiman | |
| 6,654,923 B1 | 11/2003 | Grenier et al. | |
| 6,665,495 B1 | 12/2003 | Miles | |
| 6,721,269 B2 | 4/2004 | Cao | |
| 6,735,198 B1* | 5/2004 | Edsall | H04L 45/54 370/389 |
| 6,795,402 B1 | 9/2004 | Richardson et al. | |
| 6,829,237 B2 | 12/2004 | Carson et al. | |
| 6,906,999 B1* | 6/2005 | Schulz | 370/218 |
| 6,940,851 B2 | 9/2005 | Oki et al. | |
| 6,990,063 B1 | 1/2006 | Lenoski et al. | |
| 7,016,305 B1 | 3/2006 | Michelson | |
| 7,046,681 B2 | 5/2006 | Siu et al. | |
| 7,065,580 B1* | 6/2006 | Eberle | H04L 49/55 370/447 |
| 7,079,537 B1* | 7/2006 | Kanuri | H04L 49/602 370/392 |
| 7,100,091 B2 | 8/2006 | Nakamoto et al. | |
| 7,142,509 B1 | 11/2006 | Rovner et al. | |
| 7,167,481 B2 | 1/2007 | Steele et al. | |
| 7,184,408 B2 | 2/2007 | Denton et al. | |
| 7,191,249 B1* | 3/2007 | Lacroute | G06F 15/17 709/224 |
| 7,222,255 B1 | 5/2007 | Claessens et al. | |
| 7,243,160 B2* | 7/2007 | Brahmaroutu | 709/238 |
| 7,315,963 B2 | 1/2008 | Luciani et al. | |
| 7,345,991 B1* | 3/2008 | Shabtay et al. | 370/221 |
| 7,356,077 B2 | 4/2008 | Fala et al. | |
| 7,391,736 B2 | 6/2008 | Na et al. | |
| 7,412,034 B2 | 8/2008 | Rancu et al. | |
| 7,489,641 B2 | 2/2009 | Miller et al. | |
| 7,643,424 B2* | 1/2010 | Liu | H04L 12/4633 370/236.2 |
| 7,664,110 B1 | 2/2010 | Lovett et al. | |
| 7,706,302 B2 | 4/2010 | Page | |
| 7,787,480 B1* | 8/2010 | Mehta | H04L 12/465 370/401 |
| 7,826,381 B1 | 11/2010 | Kastuar et al. | |
| 7,852,843 B2 | 12/2010 | Liu et al. | |
| 7,898,985 B1* | 3/2011 | Ghosh | H04L 45/02 370/254 |
| 7,936,783 B1 | 5/2011 | Bharali | |
| 7,966,420 B2* | 6/2011 | Mehta | H04L 12/2697 709/238 |
| 7,969,880 B2 | 6/2011 | Yano et al. | |
| 7,969,980 B1* | 6/2011 | Florit | H04L 12/185 370/390 |
| 8,014,317 B1 | 9/2011 | Ghosh | |
| 8,149,730 B1 | 4/2012 | Aybay et al. | |
| 8,174,991 B1 | 5/2012 | Trivedi | |
| 8,284,677 B2 | 10/2012 | Kini | |
| 8,625,427 B1* | 1/2014 | Terry et al. | 370/235 |
| 8,724,479 B1 | 5/2014 | Aybay | |
| 8,773,992 B2* | 7/2014 | Lai | 370/230.1 |
| 8,780,896 B2 | 7/2014 | Mehra | |
| 8,953,605 B1 | 2/2015 | Mehra | |
| 9,042,402 B1 | 5/2015 | Loganathan | |
| 2001/0021189 A1* | 9/2001 | Shiota | 370/389 |
| 2002/0016708 A1 | 2/2002 | Houh | |
| 2002/0059545 A1 | 5/2002 | Nakashima et al. | |
| 2002/0064170 A1* | 5/2002 | Siu et al. | 370/412 |
| 2002/0085507 A1* | 7/2002 | Ku | H04L 12/46 370/255 |
| 2002/0085565 A1* | 7/2002 | Ku | H04L 12/46 370/395.42 |
| 2002/0101869 A1* | 8/2002 | Garcia-Luna-Aceves et al. | 370/389 |
| 2002/0116675 A1 | 8/2002 | Gangl et al. | |
| 2002/0167950 A1* | 11/2002 | Chang | H04L 12/66 370/396 |
| 2003/0035432 A1 | 2/2003 | Sreejith | |
| 2003/0037163 A1* | 2/2003 | Kitada | H04L 12/4645 709/236 |
| 2003/0058880 A1 | 3/2003 | Sarkinen | |
| 2003/0067653 A1* | 4/2003 | Aicklen et al. | 359/139 |
| 2003/0074468 A1 | 4/2003 | Chang et al. | |
| 2003/0152075 A1* | 8/2003 | Hawthorne et al. | 370/389 |
| 2003/0156548 A1 | 8/2003 | Sapp | |
| 2003/0202535 A1* | 10/2003 | Foster et al. | 370/469 |
| 2003/0223376 A1 | 12/2003 | Elliott et al. | |
| 2004/0066781 A1* | 4/2004 | Shankar | H04L 12/4666 370/389 |
| 2005/0002334 A1 | 1/2005 | Chao et al. | |
| 2005/0068968 A1 | 3/2005 | Ovadia | |
| 2005/0083949 A1* | 4/2005 | Dobbins | H04L 12/1886 370/395.53 |
| 2005/0201400 A1* | 9/2005 | Park | H04L 47/624 370/412 |
| 2006/0002370 A1* | 1/2006 | Rabie | H04L 12/4645 370/351 |
| 2006/0165098 A1 | 7/2006 | Varma | |
| 2006/0165111 A1 | 7/2006 | Varma | |
| 2006/0165112 A1* | 7/2006 | Varma | H04L 45/22 370/428 |
| 2006/0203717 A1 | 9/2006 | Puppa et al. | |
| 2006/0239288 A1* | 10/2006 | Posey, Jr. | 370/416 |
| 2006/0262728 A1 | 11/2006 | Addeo et al. | |
| 2007/0153816 A1* | 7/2007 | Cometto et al. | 370/404 |
| 2007/0263535 A1 | 11/2007 | Shabtay | |
| 2008/0052015 A1 | 2/2008 | Ozawa et al. | |
| 2008/0123528 A1 | 5/2008 | Wyatt | |
| 2008/0279196 A1* | 11/2008 | Friskney | H04L 12/4645 370/395.53 |
| 2008/0285449 A1* | 11/2008 | Larsson et al. | 370/232 |
| 2008/0285466 A1 | 11/2008 | Salam et al. | |
| 2009/0003212 A1 | 1/2009 | Kwan | |
| 2009/0113070 A1 | 4/2009 | Mehta et al. | |
| 2010/0061378 A1 | 3/2010 | Joyner et al. | |
| 2010/0165877 A1* | 7/2010 | Shukla | H04L 41/0843 370/254 |
| 2010/0165983 A1 | 7/2010 | Aybay et al. | |
| 2010/0165984 A1 | 7/2010 | Aybay | |
| 2010/0202460 A1* | 8/2010 | Park et al. | 370/394 |
| 2010/0228842 A1 | 9/2010 | Kompella et al. | |
| 2011/0019678 A1* | 1/2011 | Mehta et al. | 370/401 |
| 2011/0188865 A1* | 8/2011 | Lalonde et al. | 398/156 |
| 2011/0194404 A1 | 8/2011 | Kluger | |
| 2011/0222413 A1 | 9/2011 | Shukla | |
| 2012/0069742 A1 | 3/2012 | Kaufmann | |
| 2012/0147893 A1 | 6/2012 | Shabtay | |
| 2012/0189009 A1 | 7/2012 | Shekhar et al. | |

OTHER PUBLICATIONS

Spirent Communications, Abacus™ 50 T1 and El, "T1 and E1 Traffic Generator Test System" P/N 79-000122 Rev.E Nov. 2007, ©2007 Spirent Communications, Inc., 4 pages.

S. Amante et al. "Operations and Maintenance Next Generation Requirements" ©The IETF Trust, (Feb. 18, 2008), 22 pages.

P. Pan et al. "Fast Reroute Extensions to RSVP-TE for LSP Tunnels," Standards Track, ©The Internet Society (May 2005), 38 pages.

Working Group Group Name: A Viswanathan et al., Force10 Networks "TraceFlow; draft-zinjuvadia-traceflow-02.txt", Internet Engineering Task Force, IETF; Standard Working Draft, Internet Society (ISOC) 4, Rue Des Falaises Ch-1205 Geneva, Switzerland, No. 2, Aug. 16, 2008, 38 pages.

(56) References Cited

OTHER PUBLICATIONS

European Extended Search Report for European Application no. 11193033.5, mailed Mar. 13, 2012.
Chinese Office Action dated Feb. 21, 2014 for Chinese Application No. 201110266365.5.
Chinese Office Action dated Nov. 3, 2014 for Chinese Application No. 201110266365.5.
Office Action mailed Dec. 8, 2010 for U.S. Appl. No. 12/464,325.
Office Action mailed Mar. 24, 2011 for U.S. Appl. No. 12/493,742.
Office Action mailed Aug. 3, 2011 for U.S. Appl. No. 12/493,742.
Office Action mailed Oct. 5, 2012 for U.S. Appl. No. 12/981,025.
Office Action mailed Jun. 24, 2013 for U.S. Appl. No. 12/981,025.
Office Action for Chinese Patent Application No. 201110266365.5 dated Jul. 7, 2015.

* cited by examiner

FIG. 7

METHODS AND APPARATUS FOR STANDARD PROTOCOL VALIDATION MECHANISMS DEPLOYED OVER A SWITCH FABRIC SYSTEM

CROSS REFERENCE TO RELATED APPLICATION

This application is a continuation of U.S. patent application Ser. No. 12/981,033, entitled "Methods and Apparatus for Standard Protocol Validation Mechanisms Deployed Over A Switch Fabric System", filed on Dec. 29, 2010, which is related to U.S. patent application Ser. No. 12/981,025, entitled "Methods And Apparatus For Validation Of Equal Cost Multi Path (ECMP) Paths In A Switch Fabric System," filed on Dec. 20, 2010, now U.S. Pat. No. 8,780,896, each of the disclosures of which is hereby incorporated herein by reference in its entirety.

BACKGROUND

Some embodiments described herein relate generally to switch fabric systems, and, in particular, to methods and apparatus for standard protocol operations, administration and management/maintenance validation mechanism over a switch fabric system.

Some known switch fabric systems include an Equal Cost Multi Path (ECMP) mechanism that provides outgoing ECMP paths from, for example, a network or an Ethernet Packet Switching Fabric switching element, as members of a single multi-chassis link aggregation group (LAG) that originate on that switching element and which individual members terminate on different downstream switching elements. In such a known switch fabric system, the traffic (e.g., data packets) can get distributed across these ECMP paths based on a LAG load distribution mechanism in the hardware of the switch fabric system. The ECMP mechanism typically includes a hashing function that operates on a set of Packet Header fields, and optionally, other values programmed or computed in the hardware datapath. In a network or switch fabric using such an ECMP mechanism, any given flow can be load-balanced to one set of ECMP paths. For example, different types of data packets (e.g., Multicast, Unicast) can be routed through different paths within the network or switch fabric.

A typical operations, administration and management/maintenance (OAM) mechanism (e.g., validation process) interfacing with such a network or switch fabric, may fail to address such routing/forwarding techniques. For example, some known OAM mechanisms can determine the service-level connectivity for each L2 hop in a network or switch fabric determined by the usual flow of OAM protocol data units (PDUs) between hops with the assumption that all flow types take the same path between the hops as determined by STP (Spanning Tree Protocol) topology. Such a known OAM mechanism, however, can give a false positive or a false negative, resulting in incorrect interpretation and determination of service-level connectivity in the network or switch fabric as a whole.

In some known switch fabric systems, different data packet types can have different forwarding paths through the switch fabric. For example, ECMP functionality can apply to one traffic type, such as, for example, unicast traffic, while ECMP functionality may not apply to other traffic types, which may take linear forwarding path(s) through the switch fabric system. For example, multicast traffic can be forwarded on paths that are determined by a virtual local area network (VLAN) flooded path; such paths may not be an ECMP path.

Accordingly, a need exists for the ability to interface a known OAM mechanism with an OAM mechanism of an associated switch fabric system to validate possible ECMP paths, and other types of forwarding paths, through the switch fabric system between an external source device coupled to the switch fabric system and an external destination device coupled to the switch fabric system.

SUMMARY

In one embodiment, an apparatus includes a destination edge device configured to receive a first validation packet according to a switch fabric validation protocol. The destination edge device is configured to validate multiple data paths through a distributed switch fabric from a source edge device to the destination edge device based on the first validation packet. The destination edge device is configured to send, in response to receiving the first validation packet, a second validation packet to a peripheral processing device. The destination edge device is also configured to send the second validation packet according to a validation protocol different from the first validation protocol.

BRIEF DESCRIPTION OF THE DRAWINGS

FIG. 7 is an example of a connectivity table associated with a switch fabric system.

DETAILED DESCRIPTION

Figure 1:
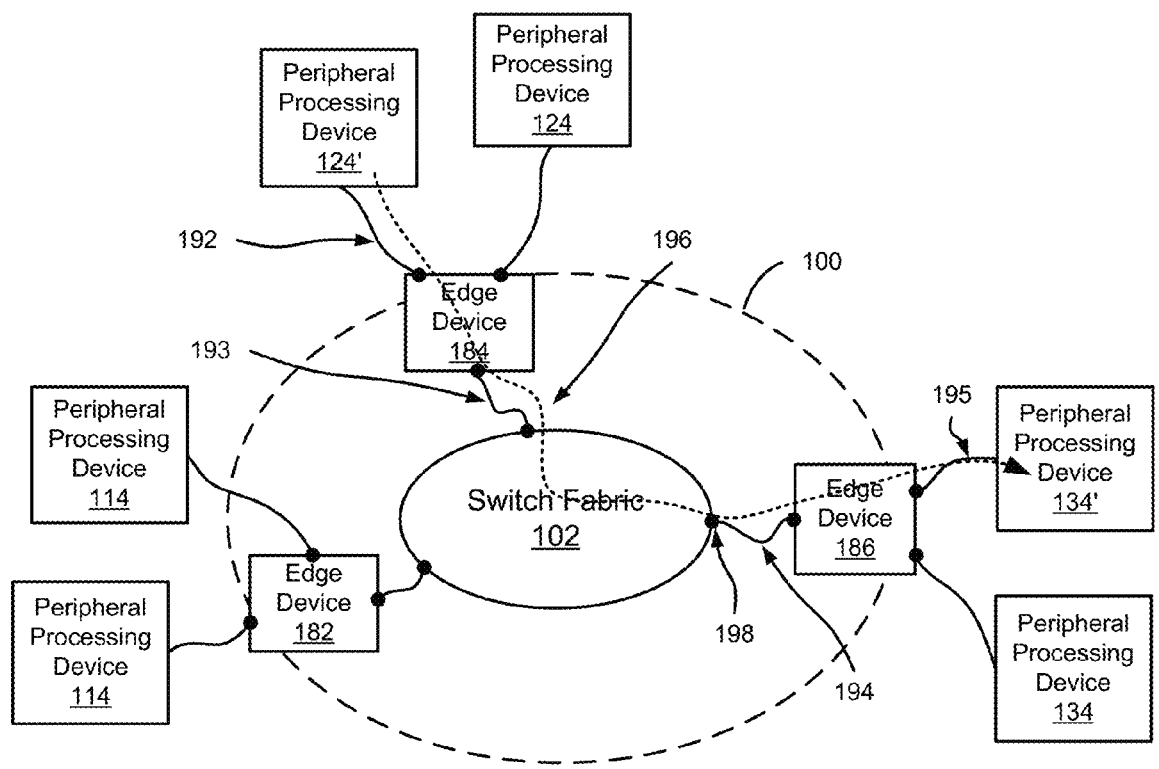
FIG. 1 is a system block diagram of a switch fabric system, according to an embodiment.

In some embodiments, an Operations, Administration and Management/Maintenance (OAM) mechanism (also referred to herein as "validation mechanism" or "validation process") within a switch fabric system can interface with a known OAM mechanism. This allows the validation of all possible paths through which a data packet can be transmitted from a first peripheral processing device coupled to the switch fabric system to a second peripheral processing device coupled to the switch fabric system. Methods and systems described herein can be used, for example, within Ethernet link aggregation group (LAG) Equal Cost Multi Path (ECMP)-based networks or packet-switched fabrics. In such a network or switch fabric, a LAG can be used as an ECMP mechanism in the Ethernet switch fabric or network, with outgoing LAG members from a single switching element terminating on multiple downstream switching elements. In such a network or switch fabric, data packets can be distributed across these ECMP paths based on a LAG load-distribution mechanism in the hardware of the switch fabric system.

In some embodiments, a switch fabric system OAM mechanism can interface with an Institute of Electrical and Electronics Engineers (IEEE) 802.1ag protocol OAM mechanism. In some embodiments, a switch fabric system OAM mechanism can interface with a virtual private local area network (LAN) service (VPLS) protocol OAM mechanism. In some embodiments, a switch fabric system OAM mechanism can interface with an ITU (International Telecommunications Union) Y.1731 protocol, or a MPLS-TP (Multiprotocol Label Switching Transport Profile) OAM protocol.

As described herein, a switch fabric system can include a switch fabric with multiple stages (e.g., a first-stage module, a second-stage module, etc.) and that can deploy an OAM mechanism to validate all possible paths of a data packet through the switch fabric system between a source edge device coupled to the switch fabric and a destination edge device coupled to the switch fabric. Such a validation process is described in U.S. Patent Application entitled "Methods and Apparatus for Validation of ECMP Paths in a Switch Fabric System," U.S. patent application Ser. No. 12/981,025, incorporated by reference above.

As described herein, in some embodiments, a first validation packet sent from a source peripheral processing device can be received at a source edge device of a switch fabric system. The first validation packet can be defined according to a first validation protocol (e.g. a standard Ethernet protocol) of the source peripheral processing device. The source edge device can include a module configured to define a second validation packet according to a second validation protocol associated with the switch fabric system (also referred to herein as "switch fabric validation protocol"). The second validation packet can, for example, include a header portion that encapsulates the header information associated with the first validation packet. The second validation packet can be sent through each possible path through the switch fabric system that a data packet can be sent to reach the destination edge device (as described in U.S. patent application Ser. No. 12/981,025) to validate each of the possible paths. The destination edge device can then define a third validation packet that can be received by a destination peripheral processing device coupled to the destination edge device. For example, the destination edge device can define a third validation packet according to a standard validation protocol compatible with the destination peripheral processing device. This standard validation protocol can be the same as the standard validation protocol compatible with the source peripheral processing device. The destination edge device can send the third validation packet to the destination peripheral processing device along with a status state indicator to indicate whether (1) all the data paths through the switch fabric system are operational, or (2) no data path through the switch fabric is operational. Thus, the status state indicator associated with the third validation packet has two possible status states.

In some embodiments, the status state indicator associated with the third validation packet can be based on a status state indicator associated with the second validation packet. For example, the destination edge device can define a status state indicator associated with the second validation packet that (1) each data path through the switch fabric system is operational, (2) one or more data paths through the switch fabric system is not operational (and the remaining paths are operational), or (3) every data path through the switch fabric system is not operational. If one or more data paths are not operational, the destination edge device can define a status state indicator to send to the destination peripheral processing device based on predefined criteria provided by the destination peripheral processing device, described in more detail below. Thus, the status state indicator associated with the second validation packet has three possible status states.

In some embodiments, an apparatus includes a destination edge device configured to receive a first validation packet according to a switch fabric validation protocol. The destination edge device is configured to validate multiple data paths through a distributed switch fabric from a source edge device to the destination edge device based on the first validation packet. The destination edge device is configured to send, in response to receiving the first validation packet, a second validation packet to a peripheral processing device. The destination edge device is also configured to send the second validation packet according to a validation protocol different from the switch fabric validation protocol.

In some embodiments, a non-transitory processor-readable medium storing code representing instructions to cause a processor to receive a first validation packet according to a switch fabric validation protocol. Multiple data paths through a distributed switch fabric from a source edge device to a destination edge device are validated. Based on the first validation packet, a second validation packet can be defined according to a validation protocol different from the switch fabric validation protocol. The second validation packet can be sent to a peripheral processing device that is compatible with the validation protocol of the second validation packet but not the switch fabric validation protocol.

In some embodiments, an apparatus includes a fabric validation module configured to receive at least one first validation packet from a distributed switch fabric according to a switch fabric validation protocol. The fabric validation module is configured to parse the at least one first validation packet to determine a status of multiple data paths through the distributed switch fabric from a source edge device to a destination edge device. A validation gateway module is configured to receive, from the fabric validation module, an indicator of the status of the multiple data paths. The validation gateway module is configured to define, based on the indicator, a second validation packet according to a validation protocol different than the switch fabric validation protocol to be sent to a peripheral processing device that is compatible with the validation protocol of the second validation packet but not the switch fabric validation protocol.

Embodiments shown and described herein refer to multiple communication layers (e.g., data link layer (layer-2), network layer (layer-3), physical layer (layer-1), application layer (layer-7), etc.). Such communication layers can be defined by the open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer, and a Border Gateway Protocol (BGP) can be associated with and/or implemented at a higher layer, such as, for example, an application layer. Although BGP can be implemented at the application layer, it can be used to send forwarding-state information (e.g., port identifiers, network segment identifiers, peripheral processing device identifiers, etc.) used to populate a routing table associated with a network layer and/or data link layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, software (executing in hardware) and/or the like.

As used herein, "associated with" can mean, for example, included in, physically located with, a part of, and/or operates or functions as a part of. For example, a module associated with a first stage of a switch fabric can be said to be included in, physically located with or a part of the first stage of the switch fabric. A module associated with a first stage of a switch fabric can also be said to operate or function as a part of the first stage of the switch fabric. Additionally, "associated with" can mean, for example, references, identifies, characterizes, describes, and/or sent from. For example, an identifier associated with a virtual channel can be an identifier that identifies, references and/or relates to the virtual channel.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIG. 2 refers to specific stages within a given switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100, according to an embodiment. The switch fabric system 100 includes a switch fabric 102 and multiple edge devices 182, 184, 186. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) within the switch fabric system 100 via the edge devices 182, 184, 186. In some embodiments, the connection between the peripheral processing devices 114, 124, 134 and the edge devices 182, 184, 186, respectively, is a direct link. Such a link can be said to be a single physical hop link. In other embodiments, the peripheral processing devices can be operatively coupled to the edge devices via intermediate modules. Such a connection can be said to be a multiple physical hop link.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing devices 114, 124, 134.

In some embodiments, the edge devices 182, 184, 186 can be a combination of hardware modules and software modules (executing in hardware). In some embodiments, for example, each edge device 182, 184, 186 can include a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data.

The edge devices 182, 184, 186 can include one or more network interface devices (e.g., a 40 Gigabit (Gb) Ethernet interface, a 100 Gb Ethernet interface, etc.) through which the edge devices 182, 184, 186 can send signals to and/or receive signals from the switch fabric 102. The signals can be sent to and/or received from the switch fabric 102 via an electrical link, an optical link and/or a wireless link operatively coupled to the edge devices 182, 184, 186. In some embodiments, the edge devices 182, 184, 186 can be configured to send signals to and/or receive signals from the switch fabric 102 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The switch fabric 102 can be any suitable switch fabric that operatively couples the edge devices 182, 184, 186 to the other edge devices 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). Similarly stated, the switch fabric 102 can be part of a single logical hop between a first edge device 182, 184, 186 and a second edge device 182, 184, 186 (e.g., along with the data paths between the edge devices 182, 184, 186 and the switch fabric 102). The switch fabric 102 can be configured to connect (e.g., facilitate communication between) the peripheral processing devices 114, 124, 134. In some embodiments, the switch fabric 102 can be configured to communicate via interface devices (not shown) configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages. More details related to architecture of the switch fabric 102 are described herein.

In use, a data packet (e.g., an Ethernet packet) can be sent between peripheral processing devices 114, 124, 134 via remaining portions of the switch fabric system 100. For example, a data packet can be sent from a first peripheral processing device 124' to a second peripheral processing device 134' via path 196. The first peripheral processing device 124' can send the data packet to the edge device 184 via link 192. The edge device 184 can then prepare the data packet to enter the switch fabric 102. Once prepared, the edge device 184 sends the data packet to the switch fabric 102 via link 193. The switching modules within the switch fabric 102 can route the data packets through the switch fabric 102. The data packet is sent through port 198 to the edge device 186 via link 194. The edge device 186 can then send the data packet to the second peripheral processing device 134' via link 195 using the first protocol.

Figure 2:
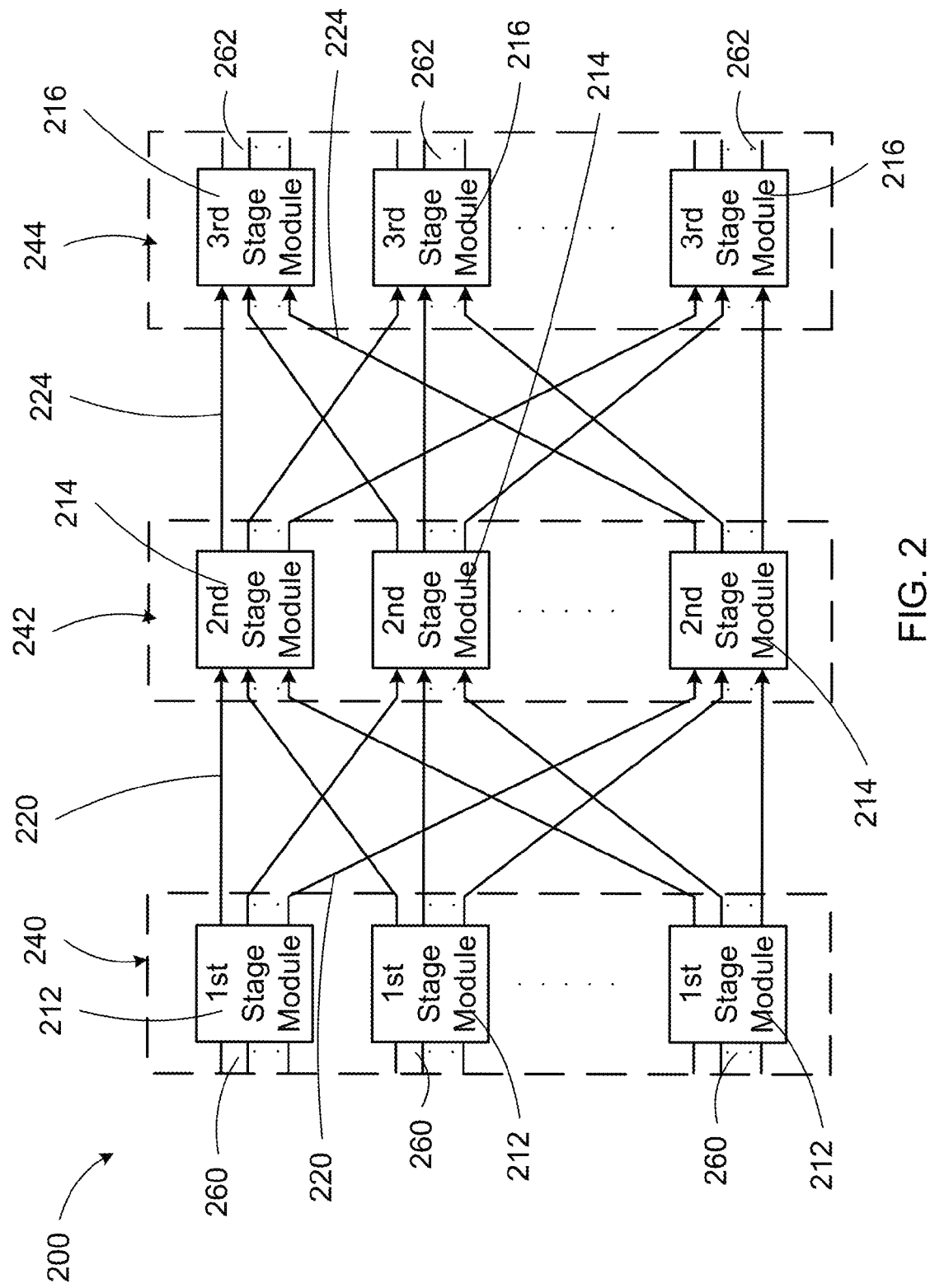
FIG. 2 is a schematic illustration of a switch fabric, according to another embodiment.

FIG. 2 is a schematic illustration of a switch fabric 200, according to an embodiment. The switch fabric 200 can include multiple physical hops that are within a single logical hop. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In some embodiments, the data paths 220 between the modules 212 of the first stage 240 and the modules 214 of the second stage 242, and the data paths between the modules 214 of the second stage 242 and the modules 216 of the third stage 244, can include multiple virtual channels.

Figure 3:
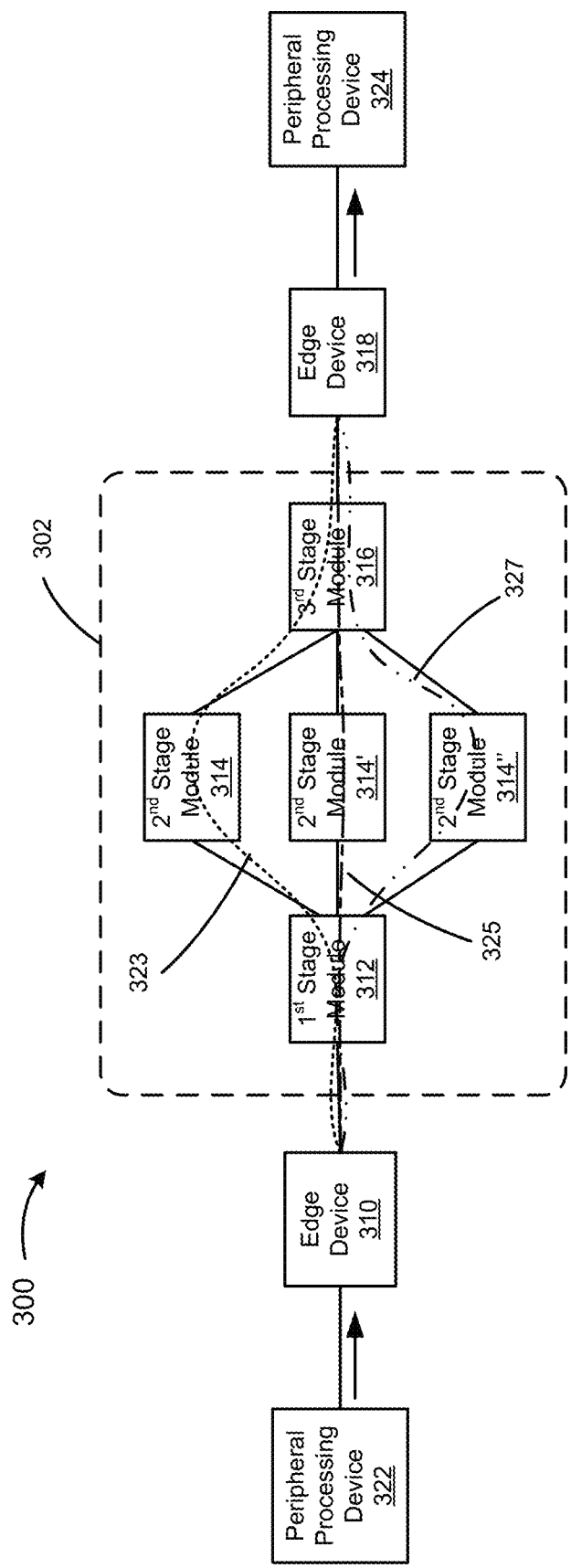
FIG. 3 is a schematic illustration of a portion of a switch fabric system, according to another embodiment.

FIG. 3 is a schematic illustration of a portion of a switch fabric system 300, according to another embodiment. The illustrated portion of the switch fabric system 300 includes a switch fabric 302, and a first edge device 310 and a second edge device 318 each operatively coupled to the switch fabric 302. The switch fabric system 300 can operatively couple a peripheral processing device 322 to a peripheral processing device 324. FIG. 3 illustrates an example of one configuration of the switch fabric system 300 showing only two edge devices 310, 318 coupled to the switch fabric 302. It should be understood, however, that the switch fabric 302 can be connected to various numbers of edge devices. It should also be understood that although only two peripheral processing devices are shown in FIG. 3, the switch fabric system 300 can operatively couple many more peripheral processing devices to each other.

The switch fabric 302 can be structurally and functionally similar to the switch fabric 200 (shown and described with respect to FIG. 2). The switch fabric 302 includes a first stage module 312, three second stage modules 314, 314' and 314", and a third stage module 316. The first stage module 312 is operatively coupled to each second stage module 314, 314', 314" via separate data paths. Similarly, each second stage module 314, 314', 314" is operatively coupled to the third stage module 316 via a separate data path. The first stage module 312 can be structurally and functionally similar to, for example, first stage modules 212 described above with reference to FIG. 2. In addition, the second stage modules 314, 314', 314" and the third stage module 316 can be structurally and functionally similar to the first stage module 312.

Although the switch fabric 302 is shown with a single first stage module 312 coupled to three second stage modules 314, 314', 314" each coupled to a single third stage module 316, it should be understood that the switch fabric 302 can include more than one first stage module, less or more than three second stage modules, and/or more than one third stage module. In some embodiments, the switch fabric 302 can be fully-interconnected similar to, for example, switch fabric 200, where each module of the first stage is coupled to each module of the second stage and each module of the second stage is coupled to each module of the third stage. In some embodiments, the switch fabric 302 may not be fully interconnected. For example, the switch fabric 302 can include a second third stage module (not shown) that is only connected to, for example, one or two of the three second stage modules 314, 314', 314".

As illustrated in FIG. 3, in this embodiment, a data packet can be transmitted from the first edge device 310 to the second edge device 318 via a first data path 323 that includes first stage module 312, second stage module 314 and third stage module 316. A data packet can also be transmitted from the first edge device 310 to the second edge device 318 via a second data path 325 that includes first stage module 312, second stage module 314' and third stage module 316, or a third data path 327 that includes first stage module 312, second stage module 314" and third stage module 316. Thus, FIG. 3 illustrates the three possible paths through the fabric switch system 300 that a data packet can be sent between first edge device 310 and second edge device 318 for this particular example. In alternative embodiments, there may be more or less possible paths out of a particular module of a particular stage.

The data paths 323, 325 and 327 include data path connections between the first stage module 312 and the second stage modules 314, 314', 314" and between the second stage modules 314, 314', 314" and the third stage module 316, each of which can be constructed in any manner configured to facilitate data transfer. In some embodiments, for example, the data paths include optical connectors, optical fibers and/or electrical connectors between the modules. In some embodiments, the data paths are within a midplane or a backplane.

The peripheral processing devices 322, 324 can be, for example, compute nodes, service nodes, routers, and storage nodes, as described in further detail herein. In some embodiments, for example, the peripheral processing devices include servers, storage devices, gateways, workstations, and/or the like. The peripheral processing devices 322, 324 can be operatively coupled to the edge devices 310 and 318, respectively, using any suitable connection such as, for example, an optical connection (e.g., an optical cable and optical connectors), an electrical connection (e.g., an electrical cable and electrical connectors) and/or the like. As such, the peripheral processing devices 322, 324 are configured to send and receive data (e.g., data packets, data cells, etc.) to and from the edge devices 310 and 318.

In use, for example, the peripheral processing device 322 can be configured to send a data packet to the peripheral processing device 324. Any peripheral processing device operatively coupled to the switch fabric 302 via an edge device (e.g., 310, 318) can be configured to send a data packet to any other peripheral processing device coupled to the switch fabric 302 via an edge device. The peripheral processing device 322 is schematically shown as a source peripheral processing device and the peripheral processing device 324 is schematically shown as a destination peripheral processing device for illustration purposes only. Structurally, the peripheral processing devices 322 and 324 can each function as source peripheral processing devices and destination peripheral processing devices. Accordingly, the peripheral processing devices 322 and 324 can each send data to and receive data from an edge device of the switch fabric system 300.

The edge devices 310 and 318 can be any devices configured to operatively couple peripheral processing devices (e.g., peripheral processing devices 322, 324) to the switch fabric 302. In some embodiments, for example, the edge devices 310 and 318 can be access switches, input/output modules, top-of-rack devices and/or the like. Edge device 310 is schematically shown as a source edge device and edge device 318 is schematically shown as a destination edge device for illustration purposes only. Structurally, the edge devices 310 and 318 can each function as source edge devices and destination edge devices. Accordingly, the edge devices 310 and 318 can each send data to and receive data from the switch fabric 302.

In this example embodiment, edge device 310 can be coupled to any number of modules of a first stage of a switch fabric, and edge device 318 can be coupled to any number of third stage modules of a switch fabric. Additionally, while shown in FIG. 3 as being operatively coupled to a single switch fabric 302, the edge devices 310, 318 can be operatively coupled to any number of switch fabrics, similar to switch fabric 302. In some embodiments, for example, the edge device 310 can be both coupled to the first stage module 312 associated with the first stage of the switch fabric 302 and a module (not shown in FIG. 3) associated with a first stage of a second switch fabric (not shown in FIG. 3). In such embodiments, the edge device 310 can send data to either the first stage module 312 or the module associated with the first stage of the second switch fabric.

In some embodiments, the edge devices 310, 318 can be configured to prepare a data packet to enter the switch fabric 302. For example, the edge device 310 can be configured to forward, classify, and/or modify the packet encapsulation of a data packet prior to sending the data packet to the switch fabric 302. In some embodiments, for example, the edge device 310 can append a source identifier (e.g., source MAC address, IP address, etc.), a destination identifier (e.g., source MAC address, IP address, etc.) and/or any other information to the data packet. Such information can be used to route the data packet through the switch fabric 302.

In some embodiments, a data packet (e.g., sent from peripheral processing device 322 to edge device 310) can include a payload portion and a header portion. The payload portion can include data to be sent to a destination peripheral processing device (e.g., peripheral processing device 324). The header portion (also referred to herein as "header") can include identifying information. In some embodiments, for example, the header can include at least a portion of an IP 5-tuple associated with the source and destination peripheral processing devices (e.g., 322 and 324, respectively). In such embodiments, for example, the header can include a destination peripheral processing device MAC address, a destination peripheral processing device internet protocol (IP) address, a source peripheral processing device MAC address, a source peripheral processing device IP address and/or a transfer protocol identifier. In the example embodiment of FIG. 3, the destination peripheral processing device MAC address and the destination peripheral processing device IP address can be associated with peripheral processing device 324, and the source peripheral processing device MAC address and the source peripheral processing device IP address can be associated with peripheral processing device 322.

In some embodiments, the edge device 310 can also append a source edge device identifier (e.g., a MAC and/or IP address associated with 310) and a destination edge device identifier (e.g., a MAC and/or IP address associated with 318). Such information can be used in conjunction with a lookup table to route the data packet through the switch fabric 302 as shown and described in U.S. patent application Ser. No. 12/607,162, filed on Nov. 18, 2009, entitled "Methods and Apparatus Related to a Distributed Switch Fabric," which is incorporated herein by reference in its entirety. Using such source and destination specific information in conjunction with a lookup table to route data packets through the switch fabric 302 can ensure that each data packet originating from a particular source (e.g., peripheral processing device 322) to be sent to a particular destination (e.g., peripheral processing device 324) will be sent through the switch fabric 302 via the same path (e.g., through the same modules associated with each stage of the switch fabric 302). Similarly stated, the order of data packets sent through the switch fabric 302 from a first edge device 310 to a second edge device 318 is maintained.

Using the information contained within the header of the data packet, the edge device 310 can determine to which first stage module to send the data packet, for example, in a switch fabric having multiple first stage modules. In some embodiments, for example, the edge device 310 can use a hash function using as inputs, a header value, such as, for example, the destination peripheral processing device MAC address, the destination peripheral processing device IP address, the source peripheral processing device MAC address, the source peripheral processing device IP address, the destination edge device identifier, the source edge device identifier and/or the transfer protocol identifier to determine to which module (e.g., which first stage module) to send the data packet.

After the first stage module 312 receives the data packet, the first stage module 312 can make a determination as to which second stage module 314, 314', 314" to send the data packet. In some embodiments, for example, the first stage module 312 can use a hash function using as an input a header value such as, for example, a destination identifier and/or a source identifier, as described above for edge device 310. Based on the input(s), the hash function can determine to which second stage module 314, 314', 314" to forward the data packet. The second stage module 314, 314', 314" can similarly use a hash function to forward the data packet to the third stage module 316. Using the destination edge device identifier, the third stage module 316 can forward the data packet to the destination edge device 318. Using the destination peripheral processing device identifier, the edge device 318 can then forward the data packet to the destination peripheral processing device 324.

During operation of the switch fabric system 300, it may be desirable to validate the switch fabric system 300 to ensure that a data packet sent from a source edge device (e.g., 310) reaches the desired destination edge device (e.g., 318) through any of possible paths (e.g., paths 323, 325, 327) that that data packet can be sent and reach the destination edge device. Because of the multiple possible paths that a data packet can be sent to reach a particular destination edge device within such an ECMP switch fabric system (e.g., 300), if a validation packet is sent through only one portion of ECMP paths (e.g., one of paths 323, 325, 327), any possible failures within the other possible paths through the switch fabric system to reach the destination edge device will not be identified. To address this issue, the switch fabric system 300 includes an OAM mechanism (e.g., validation mechanism or validation process) as described in U.S. patent application Ser. No. 12/981,025, incorporated by reference above. The validation process includes sending a different validation packet through each of the possible paths of the switch fabric system 300 that a validation packet can be sent from a source edge device to a destination edge device. Each of these validation packets can have within its header, for example, a different value associated with its different path within the switch fabric system 300. The validation process can identify any failures within those possible paths of the validation packet within the switch fabric system 300.

As described in U.S. patent application Ser. No. 12/981,025, the validation process of switch fabric system 300 can include sending a switch fabric validation packet from the source edge device 310 through all possible paths (323, 325, 327) through which the switch fabric validation packet can be sent within the switch fabric system 300 to reach the destination edge device 318. The switch fabric validation packet can be defined according to a protocol associated with the switch fabric system 300. The source edge device 310, the first stage module 312, second stage modules 314, 314', 314", and the third stage module 316 can be configured structurally and functionally the same as, or similar to, the switch modules described in U.S. patent application Ser. No. 12/981,025.

Specifically, the source edge device 310, the destination edge device 318, and each module (e.g., a first stage module 312, second stage modules 314, 314', 314", third stage module 316) of the switch fabric system 300 can include a replication engine (not shown), a processing pipeline (not shown) and a hash engine (not shown). The first stage module 312 can receive a validation packet from the source edge device 310. The validation packet can be used to test or validate the switch fabric system 300 to identify any failures within any possible path through the switch fabric system 300 that the validation packet can be sent from source edge device 310 to destination edge device 318.

When the validation packet is received at first stage module 312, the replication engine can use the information within a header portion of the validation packet to determine how many output ports are available through which the validation packet can be sent to reach the edge device 318. The replication engine can define a set of validation packets based on the number of possible output ports. Specifically, the replication engine can define a replicate or copy of the validation packet for each possible output port that the validation packet can be sent to reach the edge device 318. The replication engine can append a header to each of the validation packets that encapsulates the other headers (e.g., a header replicated from the original validation packet) included within each validation packet. The appended header can include a header value that is associated with a particular output port of the module. In some embodiments, the header value can have a direct association with an output port. For example, the header value can be defined directly from a reverse hash lookup table that includes one or more associations between a hash function input value and an identifier of an output port coupled to the first stage module 312. In some embodiments, the header value can have an indirect association to the output ports. For example, the header values can be associated to a unique hash index value that may be an index to a table of LAG members. In such an embodiment, the header values can be indirectly associated with a LAG member output port.

After appending the headers to the validation packets, the validation packets can be sent to the processing pipeline of the first stage module 312 for any further processing of the validation packets that may be performed. The validation packets can then be forwarded to the hash engine. The hash engine can use the assigned header value as input to a hash function to determine through which output port (e.g., from multiple output ports) that each of the validation packets is to be sent to reach the destination edge device 318. Because the header value was assigned based on the reverse hash lookup table, the output of the hash function is predefined to be the identifier of the output port associated with that header value in the reverse hash lookup table.

The hash engine can then forward each validation packet to a different output port to be sent to a different one of the second stage modules 314, 314', 314". Each second stage module 314, 314', 314" can perform the same functions upon receipt of a validation packet. For example, teach second stage module 314, 314', 314" can define a set of validation packets associated with each possible output port of that module to send a validation packet to the third stage module 316 (and ultimately the destination edge device 318). The third stage module 316 can also perform the same functions to the validation packet(s) received at the third stage module 316. For example, the third stage module 316 can define a set of validation packets associated with each possible output port of the third stage module 316 to send the validation packet(s) to the destination edge device 318. Thus, the switch fabric system 300 can validate all possible paths of a validation packet from the source edge device 310 to the destination edge device 318.

It may also be desirable to validate a data path from the source peripheral processing device 322 to the destination peripheral processing device 324. Because the peripheral processing devices 322, 324 can operate in accordance with a standard validation protocol that is different than the validation protocol of the switch fabric system, a typical standard protocol validation packet from a peripheral processing device sent to an edge device of the switch fabric system, may not be recognized by the edge device as a validation packet. In such a situation, the standard validation packet would be routed through the switch fabric system 300 as a standard data packet, and therefore, may not be sent through all possible paths of the switch fabric system 300. To address this incompatibility, the switch fabric system 300 includes a validation process that can interface with standard protocols and standard protocol validation packets associated with peripheral processing devices such that all possible paths through the switch fabric system 300 from the source peripheral processing device 322 to the destination peripheral processing device 324 can be validated.

Figure 4:
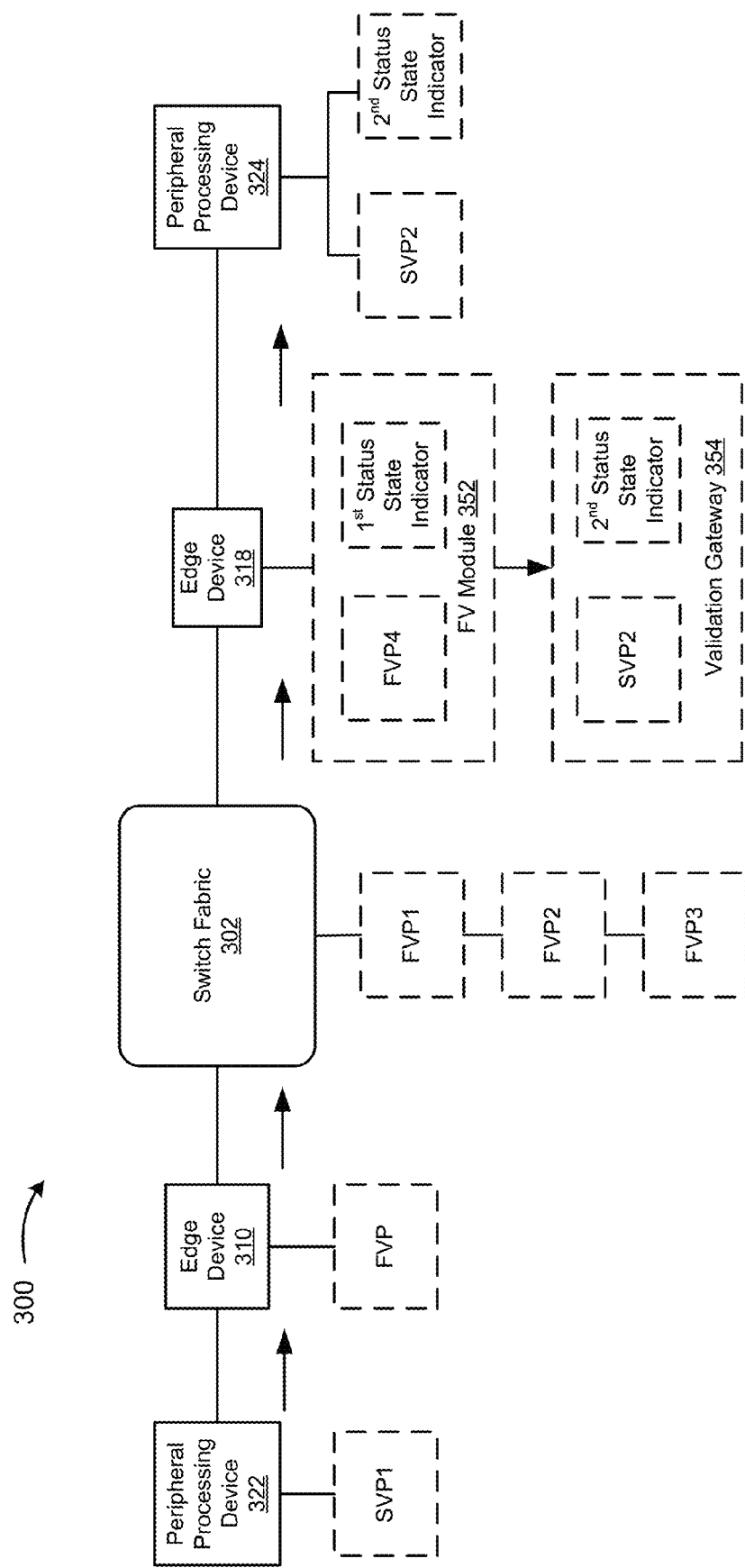
FIG. 4 is a schematic illustration of a portion of the switch fabric system of FIG. 3 illustrating a flow of validation packets.

Specifically, a standard validation packet SVP1 can be sent from the source peripheral processing device 322 to the source edge device 310, as shown in FIG. 4. The standard validation packet SVP1 can be defined according to a standard validation protocol, such as, for example, the IEEE 802.1ag protocol, the VPLS protocol, an ITU (International Telecommunications Union) Y.1731 protocol, or a MPLS-TP (Multiprotocol Label Switching Transport Profile) OAM protocol, associated with the source peripheral processing device 322. The standard validation packet SVP1 can be a data packet as described herein. The standard validation packet SVP1 can be, for example, an Ethernet data packet, and include a header (also referred to as "header portion"), having a source ID, a destination ID, etc. The standard validation packet SVP1 can be, for example, a unicast or a multicast packet. Accordingly, a SVP1 packet received at the source edge device 310 from the source peripheral device 322 can be identified by that source edge device 310 as either of a known unicast, unknown unicast, known multicast or unknown multicast packet. The standard validation packet SVP1 can be used to test or validate a data path from the source peripheral processing device 322 to the destination peripheral processing device 324.

After receipt of the standard validation packet SVP1, the source edge device 310 can define a switch fabric validation packet FVP in a similar manner as described for the validation process in U.S. patent application Ser. No. 12/981,025, and as described above for first stage module 312. For example, the source edge device 310 can define a switch fabric validation packet FVP that includes a new header in accordance with the switch fabric protocol that is appended to the standard validation packet SVP1 and encapsulates the header of the standard validation packet SVP1. The switch fabric validation packet FVP can be sent through the switch fabric system 300 as described for the validation process in U.S. patent application Ser. No. 12/981,025, (and as described above) to validate all possible paths that the switch fabric validation packet FVP can be sent through the switch fabric system 300 from source edge device 310 to destination edge device 318. As the switch fabric validation packet FVP is sent through the switch fabric system 300, one or more switch fabric validation packets FVP will ultimately be received at the destination edge device 318.

Figure 5:
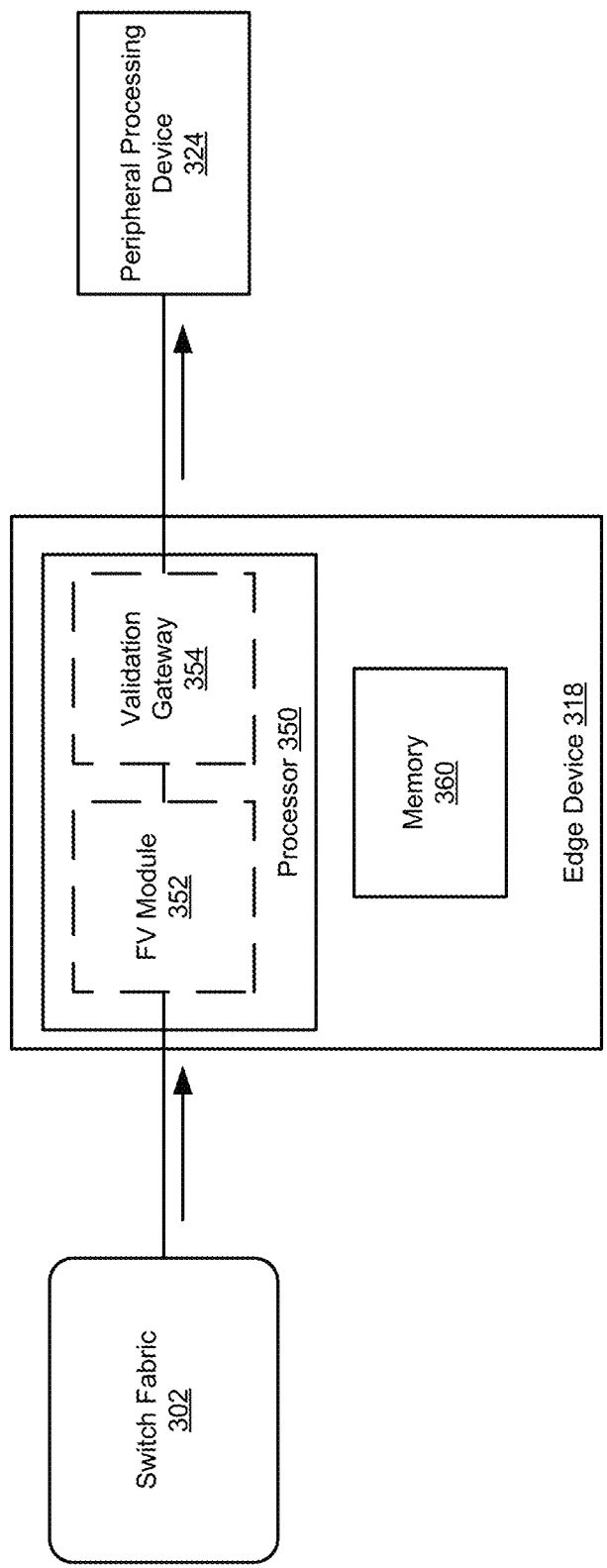
FIG. 5 is a schematic illustration of a portion of the switch fabric system of FIG. 3.

FIG. 5 illustrates the destination edge device 318. As shown in FIG. 5, the destination edge device 318 includes a processor 350 and a memory 360. The processor 350 includes a fabric validation module 352 and a validation gateway 354. The destination edge device 318 can also include other features and functions the same as or similar to other edge devices described herein and/or the destination edge devices described in U.S. patent application Ser. No. 12/981,025.

The processor 350 can be any of a variety of processors. Such processors can be implemented, for example, as hardware modules such as embedded microprocessors, microprocessors as part of a computer system, Application-Specific Integrated Circuits ("ASICs"), and Programmable Logic Devices ("PLDs"). Some such processors can have multiple instruction executing units or cores. Such processors can also be implemented as one or more software modules (executed on hardware) in programming languages, such as, Java™, C++, C, assembly, a hardware description language, or any other suitable programming language. A processor according to some embodiments can include media and computer code (also can be referred to as code) specially designed and constructed for the specific purpose or purposes. In some embodiments, for example, the processor 350 can include a field-programmable gate array (FPGA), an application specific integrated circuit (ASIC), a digital signal processor (DSP) and/or the like.

The processor 350 can be operatively coupled to the memory 360. The memory 360 can be a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, the memory 360 can be a combination of memories. For example, a memory can include a DRAM cache coupled to a magnetic disk drive and an SSD.

As described above, one or more switch fabric validation packet(s) FVP can be received at the destination edge device 318 from the switch fabric 302. For example, in the above configuration of the switch fabric system 300 shown in FIG. 3, in some embodiments, the destination edge device 318 can receive three switch fabric validation packets FVP from the third stage module 316. For example, the third stage module 316 can receive a switch fabric validation packet from each of the second stage modules 314, 314', 314", and can in turn send those three switch fabric validation packets to the destination edge device 318. As described in more detail in U.S. patent application Ser. No. 12/981,025, more or less switch fabric validation packets can be defined during the switch fabric system validation process depending on factors, such as, for example, the number of possible paths that a data packet can be sent through the switch fabric system 300 from the edge device 310 to the destination edge device 318, and the number of stages of the particular switch fabric 302. FIG. 4 illustrates three switch fabric validation packets FVP1, FVP2, FVP3 defined by switch fabric 302 and forwarded to the destination edge device 318 (e.g., from the third stage module 316), for illustration purposes.

Based on the received switch fabric validation packets FVP1, FVP2, FVP3, the fabric validation module (also referred to herein as "FV module") 352 of the destination edge device 318 can determine a failure within the switch fabric system 300. In some cases, a failure within the switch fabric system can be, for example, a common state shared by multiple services (e.g., a VLAN, a MPLS label, etc.). For example failure can occur where a scheduler queue on a port is dropping traffic. This type of failure can be shared by multiple services. In some cases, a failure can be specific to a particular service. For example, a service table may be corrupted, causing drops for a specific service(s).

In some embodiments, the FV module 352 can identify the existence of a failure, without identifying the specific location of the failure. For example, the destination edge device 318 may receive N number of switch fabric validation packets and the FV module 352 can compare that number to M number of switch fabric validation packets that the destination edge device 318 expected to receive. For example, the destination edge device 318 can store a number M of expected validation packets corresponding to the number of paths across which a validation packet can be sent from a source edge device to be received at the destination edge device 318. The FV module 352 can compare the expected number M of validation packets that should be received with the number of validation packets N actually received. If N is less than M, the FV module 352 can determine that one or more of the expected validation packets M did not reach the destination edge device 318, but may not identify which path the missing validation packet(s) was sent, or at which module(s) in that path(s) a failure may have occurred. If N is equal to M, then no failures are identified.

In some embodiments, the destination edge device 318 can identify where within the switch fabric system 300 a failure, if any, has occurred. For example, the destination edge device 318 (e.g., FV module 352) can be coded (programmed, implemented) to know all possible paths and modules that the switch fabric validation packet FVP can be sent within the switch fabric system 300 to reach the destination edge device 318. Based on the header information of the switch fabric validation packet (e.g., FVP1, FVP2, FVP3) received at the destination edge device 318, the FV module 352 can identify all the data paths and modules through which the received switch fabric validation packets FVP1, FVP2, FVP3 have been sent. Thus, the destination edge device 318 can determine which switch fabric validation packet(s) and their corresponding path(s), did not get sent to the destination edge device 318.

In some embodiments, to determine the number M of expected switch fabric validation packets that should be received at the destination edge device 318, the destination edge device 318 can receive an indication that a switch fabric validation packet(s) will be sent through the switch fabric system 300. For example, in some embodiments, the destination edge device 318 can know the number M of expected switch fabric validation packets that should be received based on a validation process activated on a preset periodic basis. For example, if the destination edge device 318 does not receive some or all of the M expected validation packet(s) based on the preset schedule, the destination edge device 318 can know that a failure exist within some or all of the possible paths from the source edge device 310 to the destination edge device 318. In some embodiments, the destination edge device 318 can be coded (programmed, implemented) to know the number M of expected switch fabric validation packets that should be received based on a validation process initiated to perform a one-time verification test. For example, in some embodiments, the switch fabric system 300 can include a control plane, and the source edge device 310 can send a signal to the destination edge device 318 to indicate that a switch fabric validation packet(s) will be sent. Thus, in such an embodiment, if the destination edge device 318 does not receive the validation packet(s), the destination edge device 318 will know that a failure exist within one or more of the possible paths from the source edge device 310 to the destination edge device 318.

Based on the determination of how many switch fabric validation packets have been received at the destination edge device 318 as described above, the FV module 352 can determine if one of three status states is present. Specifically, the FV module 352 can determine that (1) each data path through the switch fabric system 300 from the source edge device 310 to the destination edge device 318 is operational, (2) one or more data paths through the switch fabric system 300 from the source edge device 310 to the destination edge device 318 is not operational (and the remaining paths are operational), or (3) all data paths through the switch fabric system 300 from the source edge device 310 to the destination edge device 318 are not operational. As described above, if the FV module 352 determines that the expected number M of switch fabric validation packets is not received, the FV module 352 can determine that one or more of the data paths through the switch fabric system 300 are not operational. In such a situation, the FV module 352 can consolidate the received switch fabric validation packets (e.g., FVP1, FVP2, FVP3) into a single switch fabric validation packet FVP4 as shown in FIG. 4, and define a first status state indicator to append to the single switch fabric validation packet FVP4 that indicates that one or more of the data paths are not operational. The FV module 352 can then send the single switch fabric validation packet FVP4 with the first status state indicator to the validation gateway 354.

If the FV module 352 determines that all expected switch fabric validation packets have been received, the FV module 352 can consolidate the switch fabric validation packets FVP1, FVP2, FVP3 into a single switch fabric validation packet FVP4 and define a first status state indicator that indicates that all of the data paths are operational. The FV module 352 can then send the single switch fabric validation packet FVP4 with the first status state indicator to the validation gateway 354. If the FV module 352 determines that none of the expected switch fabric validation packets have been received, the FV module 352 can send a first status state indicator to the validation gateway 354 that indicates that none of the data paths are operational.

In some embodiments, the first status indicator can also include an indication of the comparison between the number N of received switch fabric validation packets and the number M of expected switch fabric validation packets. In some embodiments, such an indication can be provided as a percentage. For example, the indication can include a percentage P associated with a percentage of the expected switch fabric validation packets M that were received, where P=N/M. In some embodiments, the indication can be provided as a number of switch fabric validation packets that were not received. In some embodiments, the indication can be provided as a comparison such as N>M, or N=M. In some embodiments, the indication can be provided as N=0 to indicate no switch fabric validation packets were received.

After receipt of the consolidated switch fabric validation packet FVP4 from the FV module 352, the validation gateway 354 can remove the switch fabric header(s) that was appended to the switch fabric validation packet FVP4 during the validation process of the switch fabric system 300, leaving the original header from the standard validation packet SVP1. Thus, the validation packet FVP4 can be redefined as a standard validation packet SVP2 in accordance with the standard validation protocol of the source peripheral processing device 322 such that the standard validation packet SVP2 can be compatible with the protocol of the destination peripheral processing device 324.

In an alternative embodiment, the switch fabric validation packet FVP4 can be encapsulated within another packet, for example, a validation packet FVP5 (not shown). This validation packet FVP5 can be received at the validation gateway 354. In such an embodiment, the validation packet FVP5 can be used to validate a linear forwarding path between source edge device 310 and destination edge device 318, for example, for multicast traffic that is not multipath. As such, the validation packet FVP5 can be a multicast packet. If validation packet FVP5 is received at edge device 318, it can be treated appropriately based on the contents of the encapsulated validation packet FVP4. For example, the contents of the standard validation packet SVP2 can be dropped, or can be forwarded to the destination peripheral processing device 324. If the validation packet FVP5 is not received at edge device 318, no SVP2 can be forwarded to destination peripheral processing device 324, which indicates a drop or failure in the switch fabric.

The validation gateway 354 can also define a second status state indicator to send with the standard validation packet SVP2 to the destination peripheral processing device 324. The second status state indicator can be based on the first status state indicator defined by the FV module 352. Specifically, the validation gateway 354 can define a second status state indicator that indicates that (1) all data paths through the switch fabric system 300 from source edge device 310 to destination edge device 318 are operational, or (2) all data paths thorough the switch fabric system 300 from source edge device 310 to destination edge device 318 are not operational. In this example, because a standard protocol peripheral processing device can only interpret a status state indicator that indicates that all paths are operational or all paths are not operational, the validation gateway 354 does not define a status state indicator that indicates that one or more of the data paths (but not all) are not operational. Thus, the validation gateway 354 defines one of two possible second status state indicators based on three possible first status state indicators received from the FV module 352.

If the validation gateway 354 receives a first status state indicator from the FV module 352 that indicates that all data paths are operational, the validation gateway 354 can define the second status state indicator to indicate that all data paths are operational. If the validation gateway 354 receives a first status state indicator from the FV module 352 that indicates that all data paths are not operational, the validation gateway 354 can define the second status state indicator to indicate that all data paths are not operational. If the validation gateway 354 receives a first status state indicator from the FV module 352 that indicates that one or more of the data paths (but not all) are not operational, the validation gateway 354 can define the second status state indicator based on predefined rules or criteria provided by the destination peripheral processing device 324 described in more detail below.

In some embodiments, the predefined criteria can provide that if the first status indicator received from the FV module 352 indicates that one or more data paths (but not all) is not operational, the second status state indicator can be defined to indicate that all data paths are operational. In some embodiments, the predefined criteria can provide that if the first status indicator received from the FV module 352 indicates that one or more data paths (but not all) is not operational, the second status state indicator can be defined to indicate that no data paths are operational.

In some embodiments, the predefined criteria can provide that if the percentage P of expected switch fabric validation packets M that were received at the destination edge device 318 is over a preset threshold percentage, the second status state indicator can indicate that all data paths are not operational. The threshold percentage can be any percentage between for example, 1% and 100%. For example, in some embodiments, the threshold percentage can 50%. In some embodiments, the predefined criteria can provide that if the percentage P of expected switch fabric validation packets M that were received at the destination edge device 318 is under a preset threshold percentage, the second status state indicator can indicate that all data paths are operational. The threshold percentage can be any percentage between for example, 1% and 100%. For example, in some embodiments, the threshold percentage can 50%.

In some embodiments, the predefined criteria can provide that if a predefined number of possible data paths through the switch fabric system 300 are operational, the second status state indicator can indicate that all data paths are operational. For example, if the first status state indicator includes an indication that a number N>0 switch fabric validation packets were received, the second status state indicator can indicate that all paths are operational. In some embodiments, the predefined criteria can provide that if a predefined number of possible data paths through the switch fabric system 300 are not operational (e.g., one, two, three, etc.), the second status state indicator can indicate that all data paths are not operational. For example, if the first status state indicator includes an indication that any number N<M switch fabric validation packets were received, the second status state indicator can indicate that all paths are not operational. These are merely example predefined criteria that can be provided by destination peripheral processing device. It should be understood that other criteria and rules can alternatively be used.

After determining the second status state indicator, the validation gateway 324 can send the standard validation packet SVP2 with the second status state indicator to the destination peripheral processing device 324. Based on the standard validation packet SVP2 and the second status indicator, the destination peripheral processing device 324 can determine if the data path(s) from the source peripheral processing device 322 through the switch fabric system 300, and to the destination peripheral processing device 324 is/are operational.

While switch fabric 302 shown and described above is a three-stage switch fabric, in other embodiments of a switch fabric system a switch fabric can include any number of stages. In some embodiments, for example, the switch fabric can be a five stage switch fabric similar to the switch fabric shown and described in co-pending U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety.

Thus, the validation process described herein can be used in a switch fabric system having any number of modules and any number of stages. For example, in other embodiments, such as, for example, a five stage switch fabric, more than one third stage module can exist, and therefore, the possibility of multiple different paths from the third stage module to a fourth stage module(s) and multiple different paths from the fourth stage module(s) to the fifth stage module. In such an embodiment, the third stage module can define validation packets associated with each of the possible output ports in the same manner as described above for the first stage module and the second stage module. Additionally, the validation process described herein can be used for a single link between a module of one stage and a module of another stage of a switch fabric, as described for switch fabric system 300, or can be used to verify a LAG between a module of one stage and modules of another stage of a switch fabric. The validation process can also be used to validate a LAG between an edge device and a peripheral processing device.

Figure 6:
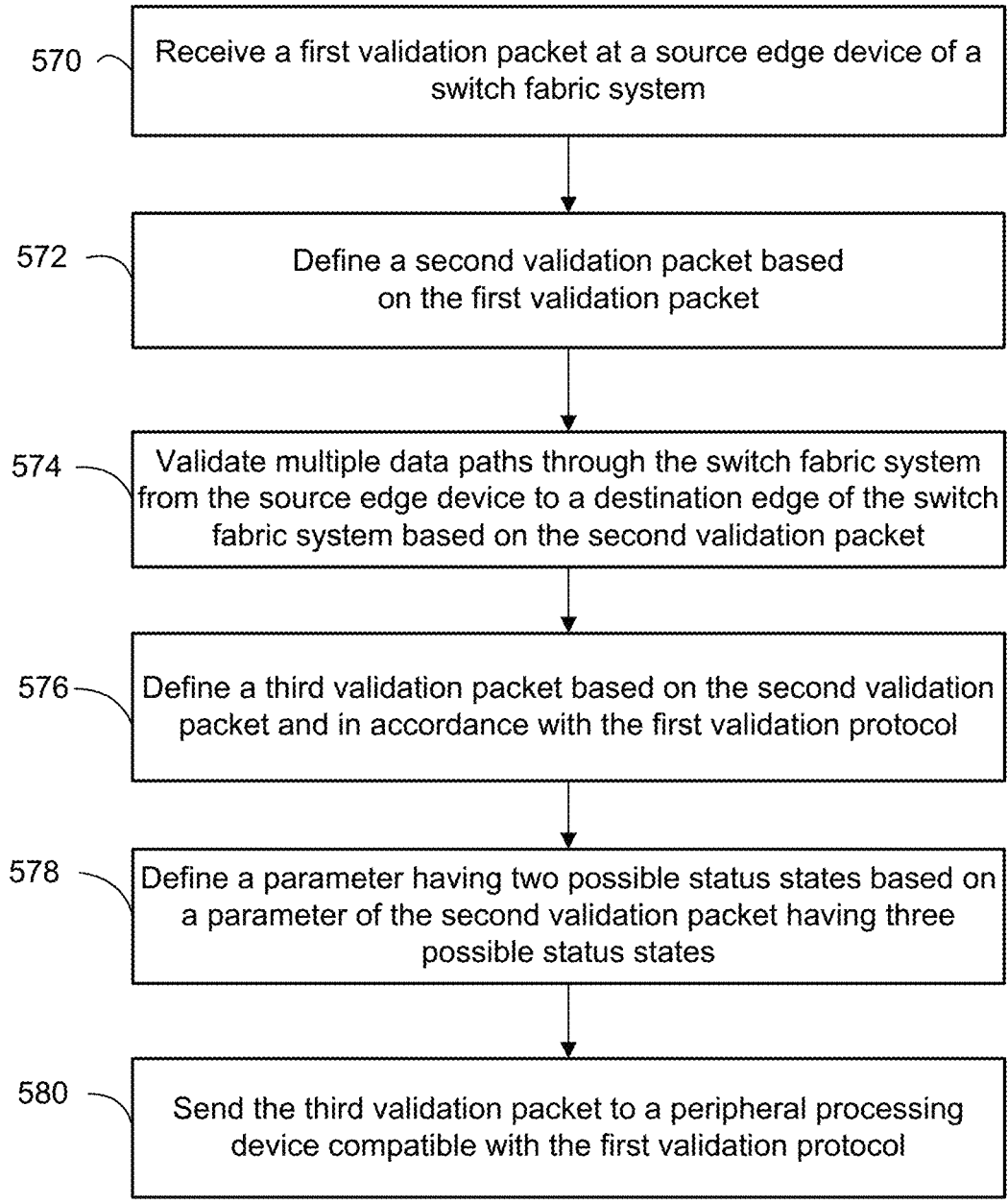
FIG. 6 is a flow chart illustrating a method of validating a data path between peripheral processing devices coupled to a switch fabric system, according to an embodiment.

FIG. 6 is a flowchart illustrating a method of validating a data path between peripheral processing devices coupled to a switch fabric system, according to an embodiment. At 570, a first validation packet (e.g., standard validation packet SVP1 described herein) can be received at a source edge device of a switch fabric system. The switch fabric system can be, for example, a switch fabric system as described herein. The first validation packet can be defined in accordance with a first validation protocol. For example, in some embodiments, the first validation protocol can be, a VPLS operations, administration and management OAM protocol. In some embodiments, the first validation protocol can be an IEEE 802.1ag protocol, or an ITU (International Telecommunications Union) Y.1731 protocol, or a MPLS-TP (Multiprotocol Label Switching Transport Profile) OAM protocol.

At 572, the source edge device can define a second validation packet (e.g., switch fabric validation packet FVP described herein) based on the first validation packet. The second validation packet can be defined in accordance with a second validation protocol associated with the switch fabric system (also referred to as "switch fabric validation protocol") that is different than the first validation protocol of the first validation packet. At 574, multiple data paths through the switch fabric system from the source edge device to a destination edge of the switch fabric system can be validated based on the second validation packet. A data path that is validated can be, for example, a multicast data path or a unicast data path. At 576, a third validation packet (e.g., standard validation packet SVP2) can be defined by the destination edge device based on the second validation packet and in accordance with the first validation protocol.

At 578, a parameter that has two possible status states can be defined based on a parameter of the second validation packet that has at least three possible status states. For example, as described herein, a first status state indicator can be defined for the second validation packet, and a second status state indicator can be defined for the third validation packet based on the first status state indicator. At 580, the third validation packet can be sent to a destination peripheral processing device coupled to the destination edge device. The destination peripheral processing device can be compatible with the first validation protocol, but not compatible with the second validation protocol.

Figure 7:
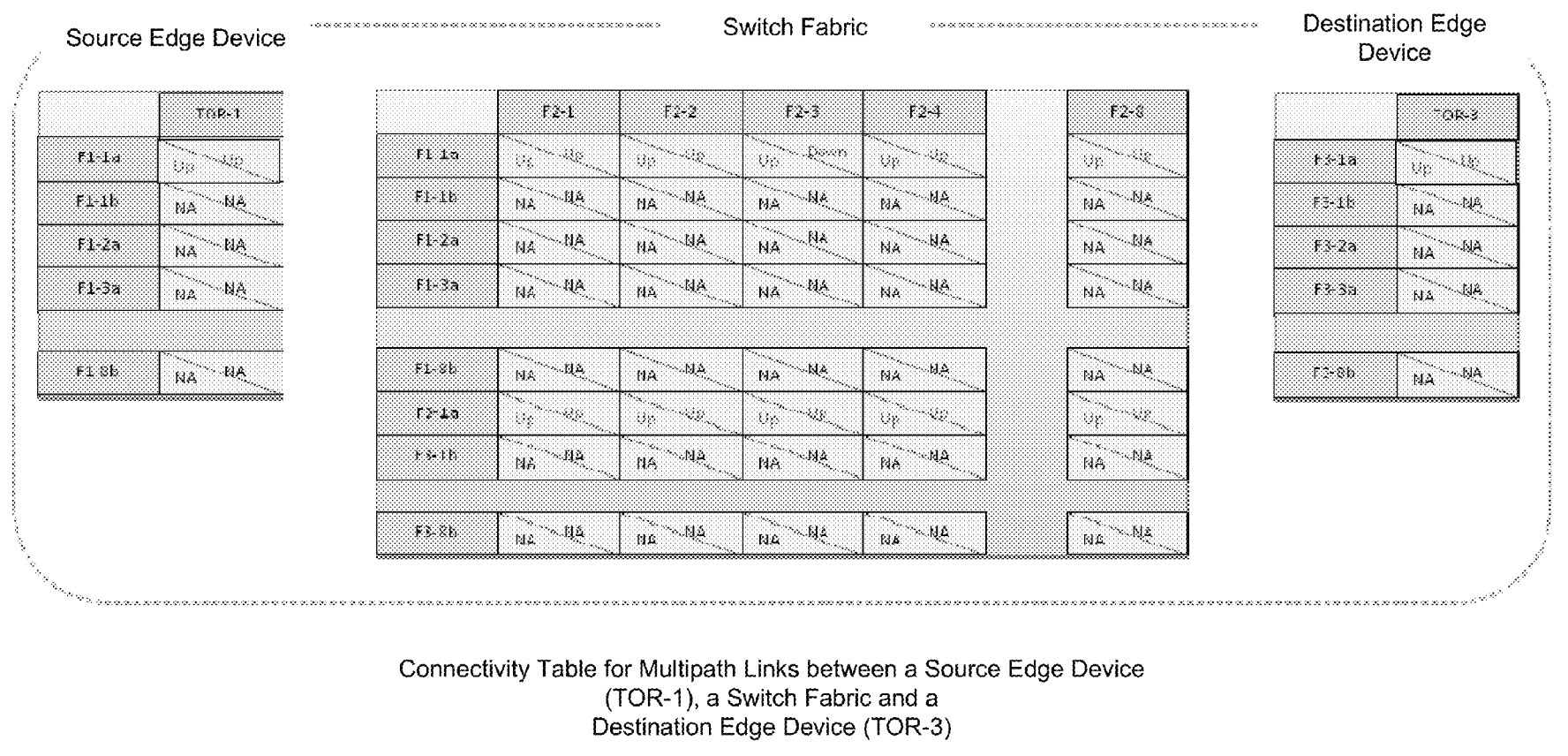

In some embodiments, a OAM management module (OMM) coupled to the switch fabric (e.g., located at a compute node) can be a centralized entity that tracks the transmission of OAM packets from each stage to downstream stage(s). The receipt or timeout can be indicated to this OMM. The OMM can be accessed by, for example, a network administrator that is responsible for setting up the forwarding paths in the switch fabric. The OMM can prepare a connectivity table (also referred to as a link-state table or a link-state graph) of the forwarding state across the fabric an example of which is shown in FIG. 7. The connectivity table can capture the forwarding status of the multipath within the switch fabric system. The connectivity table can also capture the forwarding state for paths corresponding to different types of traffic flows, such as, for example, multicast or broadcast. The connectivity table may collapse the forwarding state information across a source edge device (shown as TOR-1 in FIG. 7) and a destination edge device (shown as TOR-3 in FIG. 7) corresponding to different types of traffic flows (e.g., multipath, unicast, Mcast, Bcast) to obtain a single forwarding state connectivity table, which includes an "ANDING" of different flow types.

The Standard Validation Protocol configuration applied by a user to the switch fabric is shared with the OMM. When a Standard Validation Protocol (SVP) PDU is received at an ingress edge device, which also has a valid SVP configuration, the SVP PDU can be forwarded to the OMM. In some embodiments, the OMM can initiate the generation of a connectivity table based on the shared SVP configuration. In such a case, the connectivity table is also periodically refreshed. The OMM can generate a mapping between the received SVP PDU, and the connectivity table. In alternate embodiments, the OMM can trigger the generation of the connectivity table based on the received SVP PDU.

Because the OMM is aware of the SVP configuration across the switch fabric, the OMM is thus aware of the target edge device(s) from where the SVP PDU will egress the switch fabric. The OMM forwards the received SVP PDU to the subset of egress edge devices (from among this set) that have some forwarding path reachability from the concerned ingress edge device The OMM can perform verification of the link states within the switch fabric by sending switch fabric OAM PDUs (or SVP PDUs) across relevant multiple forwarding paths within the switch fabric, for example, between modules of the switch fabric discussed above in connection with FIG. 2. The OMM tracks the receipt of each PDUs sent from a module within the switch fabric to an adjacent module within the switch fabric, and when not received, tracks timeouts of the PDUs. Based on these received PDUs and timeouts, the OMM can build and refresh the connectivity table (or link-state table or link-state graph), reflecting separately the state across each hop within the switch fabric.

Once the link states have been identified, the OMM can collapse the link states, as discussed below, to a set of two status indicators. Alternatively, the OMM can use the link states to prepare a detailed internal view of the switch fabric. The link states can be sent to target edge devices, which can use the link state to generate the appropriate validation packets and send them to the appropriate peripheral processing devices.

As shown in FIG. 7, the source edge device (TOR-1) can be, for example, an edge device such as edge device 184 shown in FIG. 1, and the destination edge device (TOR-3) can be for example, an edge device such as edge device 186 in FIG. 1. The switch fabric of FIG. 7 can be, for example, similar to the switch fabric 200 shown in FIG. 2. The switch fabric in FIG. 7 includes a first stage including first stage modules F1-1*a* through F1-8*a*, a second stage including second stage modules F2-1 through F2-8*b*, and a third stage including third stage modules F3-1*a* through F3-8*b*. As shown in the connectivity table, the source edge device is connected to the first stage module F1-1*a*. The first stage module F1-1*a* is connected to the second stage modules F2-1 through F2-8 and each of the second stage modules (F2-1 through F2-8) is connected to the third stage module F3-1*a*. The third stage module F3-1*a* is connected to the destination edge device (TOR-3).

The generation of this connectivity table can be triggered, for example, based on a user action (e.g., command) on the source edge device, or for example, receipt of a standard OAM protocol data unit on the source edge device. Alternatively, the connectivity mechanism can be a periodic operation tracking forwarding state across the switch fabric.

In an alternative embodiment, the central connectivity table can maintain the aggregate forwarding state for the entire switch fabric based on the transmitting and receiving of individual switch fabric validation packets (FVPs) across hops. The status state indicator of switch fabric validation packets (FVPs) can carry a summary or detailed information taken from the connectivity table, providing the degraded path information inside the switch fabric for forwarding paths between the source edge device and the destination edge device.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. In addition, the embodiments described herein can include various other features and functions not specifically illustrated and described with reference to specific embodiments.

For example, in some embodiments, a data packet (e.g., a validation packet) can also include a virtual local area network (VLAN) identifier in a header of the data packet. In some embodiments of a validation mechanism as described herein, such a VLAN identifier can contribute to the determination as to the paths of the switch fabric system that the validation packet can be routed. For example, in some embodiments, the hash function used at the hash engine of a switch module can be coded (programmed, implemented) such that the validation packet is not sent through one or more possible output ports of the switch module (e.g., those ports associated with a different VLAN).

Although validation processes described herein refer to a switch fabric system validation process interfacing with a standard protocol validation process, in some embodiments, a validation process can be configured to interface with other types of validation processes. For example, a validation process can include a switch fabric validation process interfacing with other known standard protocols, non-standardized protocols and/or proprietary protocols not specifically discussed herein.

In some embodiments, a validation packet can include header information to ensure the validation packet gets sent to all egress queues of a switch module. For example, a switch module described herein can have one or more egress queues associated with the output ports of the switch module. An egress queue can ensure that a data packet is sent to the proper output port for that data packet. For example, a switch module can have a first output port for sending high priority data packets and a second output port for sending low priority data packets. In some embodiments of a validation mechanism as described herein, an egress queue identifier can contribute to the determination as to the paths of the switch fabric system that a validation packet can be sent. For example, in addition to determining which output port a validation packet can be sent, a header value of the validation packet can indicate which egress queue(s) the validation packet can be sent.

In some embodiments, a validation packet can include header information that defines a certain quality of service (QoS) treatment inside the switch fabric. For example, if the user is experiences dropped packets with a particular class of service (COS) traffic, the user can initiate or configure an OAM with the specific COS value. The COS value can be included in the validation packet header and the OAM validation mechanism as described herein can then be initiated. In such a case, the forwarding paths corresponding to that COS value can also be validated.

In some embodiments, a switch module can include multiple lookup tables. For example, different hash lookup tables can be defined for different types of data packets (e.g., known unicast, unknown unicast, known multicast, unknown multicast). The different types of data packets can have different paths through the switch fabric system between a source edge device and a destination edge device. Thus, for example, a first hash lookup table can be used for a unicast validation packet, and a second hash lookup table can be used for a multicast validation packet. Each lookup table can define different header values to append, insert or translate in the header of the validation packet based on the type of validation packet.

In addition, depending on the type of validation packet, the validation packet can be routed to a different output port of the switch module. For example, in the switch fabric system of FIG. 3, a multicast validation packet may be designated to be routed through only path 323 and a unicast validation packet may be routed to go through only path 325. Depending on the type of validation packet, the validation packet can also be routed to a different part of the processing pipeline of the switch module. For example, the header value of a unicast validation packet may route the validation packet to a different part of the processing pipeline than for a multicast validation packet. In some embodiments, a first type of validation packet (e.g., unicast) and a second type of validation packet (e.g., multicast) can be routed to different parts of the processing pipeline, and be sent to the same output port of a switch module.

In some embodiments, a data packet (e.g., a validation packet) can include other different types of headers, such as, for example, a Logical Link Control (LLC) header and/or a Sub Network Access Protocol (SNAP) header. SNAP headers can be specific type values associated with a specific organization or can be generic. Such LLC and/or SNAP headers can also be used in a validation process described herein to indicate different processing that may be done to the switch fabric validation packet and/or different routing of the switch fabric validation packet through the switch fabric system.

In some embodiments, a validation packet can include a Time-To-Live (TTL) header field that can be used to prevent a validation packet from being caught in a loop and taking up resources (e.g., bandwidth) in the switch fabric system. For example, in some situations, a failure in the switch fabric system can cause a data packet to continually loop through a portion of the switch fabric system. A validation packet can include a TTL header with an initial TTL value of N that is greater than the number of physical hops M in the switch fabric system between the source edge device and the destination edge device. For example, in the switch fabric system 300 illustrated in FIG. 3, the switch fabric system 300 includes 4 physical hops (a first hop from the source edge device to the first stage module, a second hop from the first stage module to the second stage modules, a third hop from the second stage modules to the third stage module, and a fourth hop from the third stage module to the destination edge device). In such an embodiment, the TTL value N will initially be greater than 4.

As the validation packet is sent between modules of the switch fabric system, the TTL value can be decremented at each physical hop. Thus, if the validation packet is sent through the switch fabric system and reaches the destination edge device, the TTL value should be greater than zero. If the validation packet gets caught in a loop, for example looping back through a module, each time the validation packet is sent back to that same module, the TTL value will be decremented until the TTL value is equal to zero. Each module in the switch fabric system can check the TTL field to determine the TTL value for that validation packet. When the TTL value is equal to zero, the module will discard and/or drop the validation packet. Thus, that validation packet will not reach the destination edge device. In such a situation, the destination edge device can determine that the correct number of validation packets were not received and that a failure in the switch fabric system has occurred as previously described.

In some embodiments, a validation packet can include a Type-Link-Value (TLV) header field. The TLV field can maintain a log of the path the validation packet is taking through the switch fabric system. At each module of the switch fabric system, the TLV header can append an identifier of the module to the validation packet. In some embodiments, the TLV header can append an identifier associated with an output port of the module to which the validation packet is sent. For example, in a LAG the TLV header can append an identifier for the particular output port that the validation packet is sent. The TLV information can be used, for example, at the destination edge device to determine the specific path a validation packet as passed through in the switch fabric system. In some embodiments, a status state indicator as described herein can be included in a TLV header and the packet can be sent to the designated destination peripheral processing device. A mechanism can be provided to identify the structure of the status state within the TLV header to a user.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy network workloads. In some embodiments, the services nodes can perform computations on a per-packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
a destination edge device configured to receive, according to a first validation protocol, a first validation packet, the destination edge device configured to validate, based on the first validation packet, (1) a first data path through a distributed switch fabric from a source edge device to the destination edge device, and (2) a second data path through the distributed switch fabric from the source edge device to the destination edge device,
the destination edge device configured to send, in response to receiving the first validation packet and according to a second validation protocol different from the first validation protocol, a second validation packet to a peripheral processing device.

2. The apparatus of claim 1 wherein the second validation protocol is a virtual private local area network (LAN) service (VPLS) operations, administration and management (OAM) protocol.

3. The apparatus of claim 1, wherein the second validation protocol is one of an Institute of Electrical and Electronics Engineers (IEEE) 802.1ag protocol, an International Telecommunications Union (ITU) Y.1731 protocol and a Multiprotocol Label Switching Transport (MPLS-TP) OAM protocol.

4. The apparatus of claim 1, wherein the peripheral processing device is directly coupled to the destination edge device.

5. The apparatus of claim 1, wherein the first validation packet can be sent to the distributed switch fabric in response to the source edge device receiving a third validation packet according to the second validation protocol.

6. The apparatus of claim 1 wherein the first data path from the plurality of data paths is a multicast data path and the second data path from the plurality of data paths is a unicast data path.

7. The apparatus of claim 1, wherein the peripheral processing device is compatible with the second validation protocol but not the first validation protocol.

8. A non-transitory processor-readable medium storing code representing instructions, which when executed by a processor, perform method steps of:
receiving, according to a first validation protocol, a first validation packet that is associated with a first status state indicator, the first validation protocol supporting a first number of status states of the first status state indicator;
validating, a plurality of data paths through a distributed switch fabric from a source edge device to a destination edge device based on the first validation packet;
defining, based on the first validation packet and according to a second validation protocol, a second validation packet that is associated with a second status state indicator, the second validation protocol supporting a second number of status states of the second status state indicator, the first number of status states different from the second number of status states; and
sending the second validation packet to a peripheral processing device that is compatible with the second validation protocol but that is not compatible with the first validation protocol.

9. The non-transitory processor-readable medium of claim 8, wherein the peripheral processing device is directly coupled to the destination edge device.

10. The non-transitory processor-readable medium of claim 8, wherein the code representing instructions to cause the processor to define the second validation packet includes code representing instructions to cause the processor to define a parameter of the second validation packet having two status states based on a parameter of the first validation packet having at least three status states.

11. The non-transitory processor-readable medium of claim 8, wherein a first data path from the plurality of data paths is a multicast data path, a second data path from the plurality of data paths is a unicast data path.

12. The non-transitory processor-readable medium of claim 8, wherein the second validation protocol is a virtual private local area network (LAN) service (VPLS) operations, administration and management (OAM) protocol.

13. The non-transitory processor-readable medium of claim 8, wherein the second validation protocol is one of an Institute of Electrical and Electronics Engineers (IEEE) 802.1ag protocol, an International Telecommunications Union (ITU) Y.1.731 protocol and a Multiprotocol Label Switching Transport (MPLS-TP) OAM protocol.

14. An apparatus, comprising:
a fabric validation module configured to receive, according to a first validation protocol, a first validation packet that is associated with a first status state indicator from a distributed switch fabric, the fabric validation module configured to parse the first validation packet to determine a status of (1) a first data path through the distributed switch fabric from a source edge device to a destination edge device, and (2) a second data path through the distributed switch fabric from the source edge device to the destination edge device, the first validation protocol supporting a first number of status states of the first status state indicator; and
a validation gateway module configured to receive, from the fabric validation module, an indicator of the status of the first data path and the status of the second data path, the validation gateway module configured to define, based on the indicator and according to a second validation protocol, a second validation packet to be sent to a peripheral processing device compatible with the second validation protocol but not the first validation protocol, the second validation protocol supporting a second number of status states of the second status state indicator, the first number of status states different from the second number of status state.

15. The apparatus of claim 14, wherein the fabric validation module and the validation gateway module are at the destination edge device.

16. The apparatus of claim 14, wherein the first data path is a multicast data path and the second data path is a unicast data path.

17. The apparatus of claim 14, wherein the fabric validation module is configured to receive the first validation packet in response to the source edge device receiving a third validation packet according to the second validation protocol.

18. The apparatus of claim 14, wherein the second validation protocol is a virtual private local area network (LAN) service (VPLS) operations, administration and management (OAM) protocol.

19. The apparatus of claim 14, wherein the second validation protocol is one of an Institute of Electrical and Electronics Engineers (IEEE) 802.1ag protocol, an International Telecommunications Union (ITU) Y.1.731 protocol and a Multiprotocol Label Switching Transport (MPLS-TP) OAM protocol.

20. The apparatus of claim 14, wherein peripheral processing device is directly coupled to the destination edge device.

* * * * *